United States Patent [19]

Van Doorn et al.

[11] 4,077,531
[45] Mar. 7, 1978

[54] APPARATUS FOR HANDLING AND DISPERSING MODULES OF SEED COTTON

[75] Inventors: Donald W. Van Doorn; William A. Harmon, both of Columbus, Ga.

[73] Assignee: Lummus Industries, Inc., Columbus, Ga.

[21] Appl. No.: 690,285

[22] Filed: May 26, 1976

[51] Int. Cl.² ............................................. B65B 69/00
[52] U.S. Cl. .................................. 214/309; 19/80 R; 198/511; 198/518; 198/598; 214/8.5 H; 214/83.26; 214/91 R
[58] Field of Search ................. 214/309, 91 R, 83.26, 214/6 B, 8.5 G, 522; 198/518, 598, 589, 309, 314, 318, 506, 511, 592; 241/101.7, 222, 223, 280

[56] References Cited

U.S. PATENT DOCUMENTS

| | | | |
|---|---|---|---|
| 2,427,324 | 9/1947 | Farr | 198/309 |
| 3,341,039 | 9/1967 | Cranage | 198/318 X |
| 3,451,569 | 6/1969 | Remensperger | 214/309 |
| 3,780,893 | 12/1973 | Lassig | 214/6 P X |
| 3,876,098 | 4/1975 | Cawrse | 214/83.26 |
| 3,897,018 | 7/1975 | Wilkes | 241/223 |

FOREIGN PATENT DOCUMENTS 244,853  1/1966  Austria ............................. 214/522

Primary Examiner—Trygve M. Blix
Assistant Examiner—George F. Abraham
Attorney, Agent, or Firm—Hugh P. Carter

[57] ABSTRACT

An improved system for removing modules of seed cotton either from a pallet, a transport vehicle, or, with slight modifications, from the ground when incorporated as a part of a transport vehicle. The apparatus comprises a conveyor with a discharge end and a receiving end. At the receiving end there is provided a cotton module engaging and lifting mechanism comprising a plurality of driven, toothed, disc-like lifting members, a multiplicity of the same being mounted in a framework for vertical reciprocation so that upon engaging an oncoming mass of seed cotton the entire unit moves downwardly, thus to get under and lift the seed cotton onto the conveyor. The cotton is fed to a disperser unit which breaks it down into individual locks, or at least groups of locks small enough to be fed to a gin.

8 Claims, 14 Drawing Figures

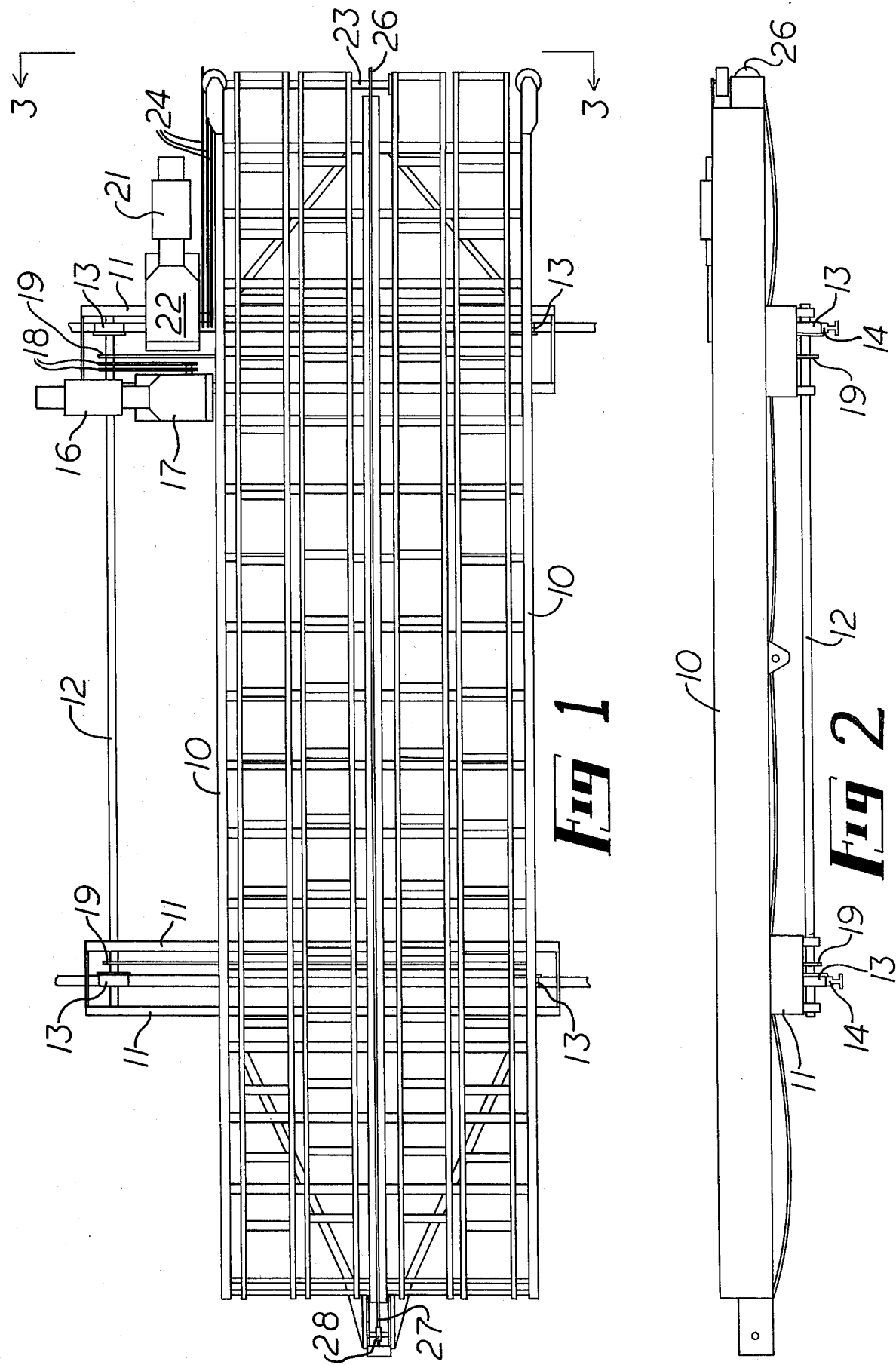

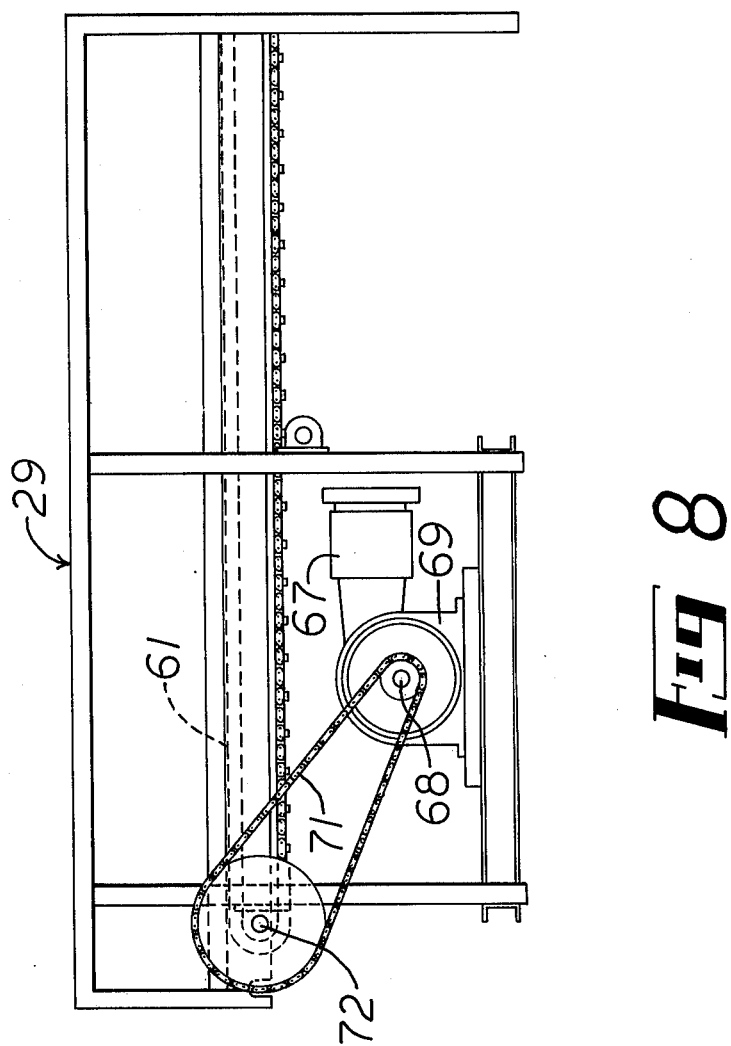

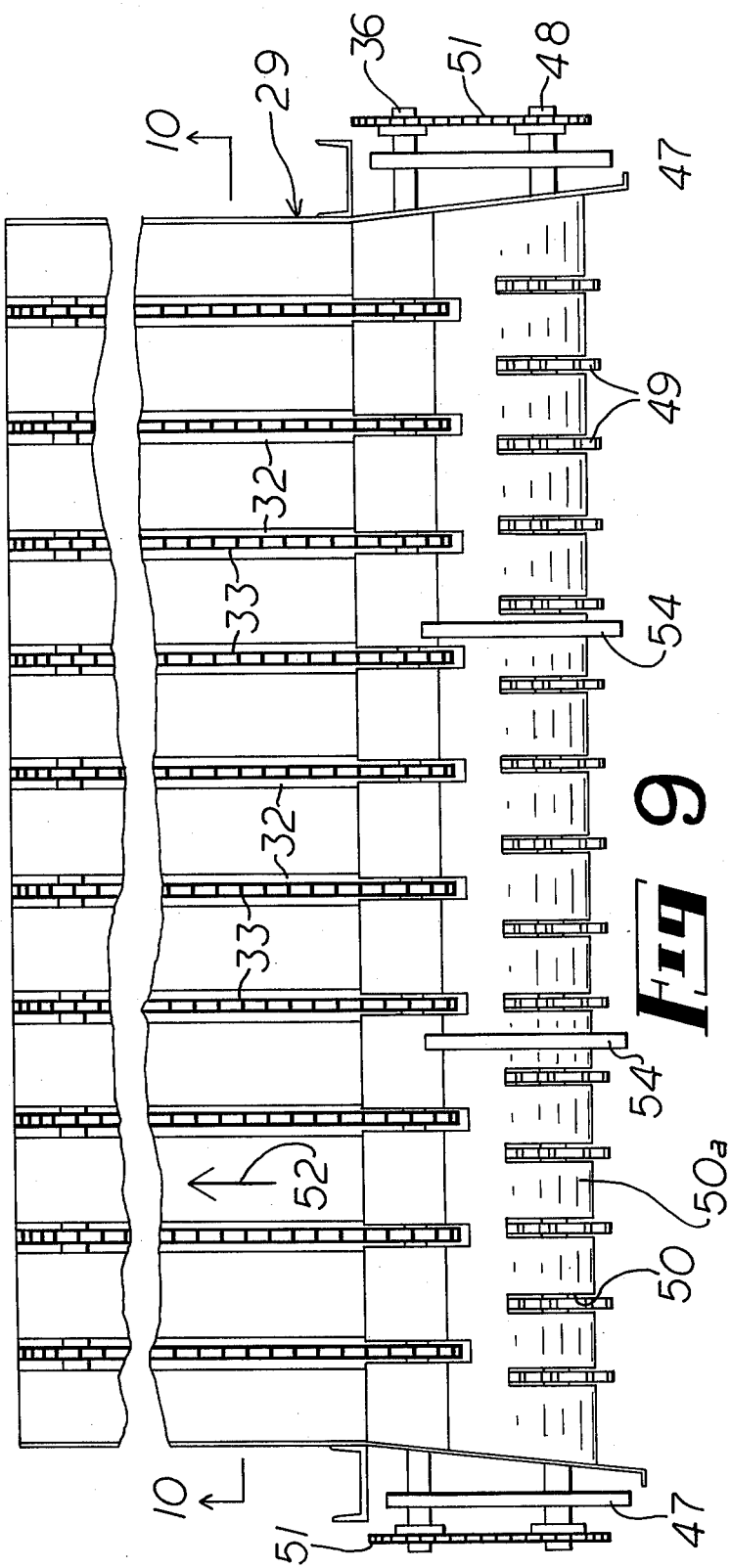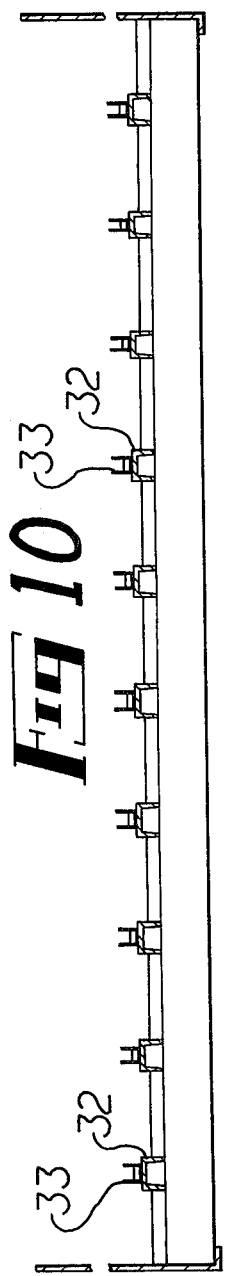

APPARATUS FOR HANDLING AND DISPERSING MODULES OF SEED COTTON

This invention relates to apparatus for handling and feeding seed cotton to gins.

One of the modern ways of handling seed cotton is, after the same is picked, to form it into what we call "modules" in the field, namely, a partially compacted mass, generally rectangular in shape, of seed cotton. This cotton either is compacted on a pallet, coextensive in dimensions with the length and breadth of the module or, the module may be partially compacted and simply set on the ground or upon a thin flexible protective sheet of material. When it is desired to transport the modulized cotton, either on the pallet or not on the pallet, to the gin house, a special vehicle is employed to pick up either the pallet-borne cotton or the module from the ground.

Various mechanisms have heretofore been proposed to remove the cotton from the pallet on the vehicle or to receive it from the bed or support of the vehicle itself on which the module rests. One form of prior apparatus proposes to remove the pallet carrying the module by a form of conveyor mechanism and then to discharge the cotton from the module at the point where the cotton is dispersed, namely, where the module is disintergrated, for sending the cotton to the gins. Another form used where no pallet is employed is to provide the vehicle which transports the module from the field to the gin house with driven chains on its load supporting deck which engage the module and move it bodily along the bed of the truck, onto receiver conveying mechanisms.

Our invention proposes the use of apparatus which may with equal facility receive a palletized module of cotton, a non-palletized module of cotton, or, with the addition of side walls, loose cotton, convey the same from the point of reception to a disperser unit constructed and arranged to separate the more or less wadded or compact cotton into individual locks or groups of locks capable of being conveyed to the ginhouse equipment such as dryers, feeders, etc., and finally to the gin.

More in detail, our invention comprises a generally horizontal conveyor comprising a closed or imperforate deck and a plurality of chains, all driven in unison, the upper flights being spaced slightly above the level of the deck, whereby a module of cotton placed on the chains is moved from a receiving end to a cotton disperser unit located at the opposite end of the deck and chains. One important feature of our invention is a driven pick-up mechanism located at the receiving ends of the chain deck adapted to raise the module of cotton either from the pallet on which it may be presented to the apparatus or, alternatively, to raise the module from the bed of a vehicle on which it rests and thereby place it upon the chains for movement to the disperser.

One specific feature of our invention is the provision of means to discharge the cotton from a pallet on which it rests at the receiving end of the apparatus, permitting the pallet to move beneath the receiving end, thus immediately to be available for reuse and in fact, to be returned to the field by the transport vehicle which brought it loaded with cotton to our improved apparatus.

More specifically, our improved apparatus contemplates a cotton module handling apparatus comprising a generally horizontal, elongated conveyor, there being a unit at the receiving end which is capable of picking up modules or removing modules from pallets even though the modules or the pallets are not precisely vertically aligned with the general level of the bed to which they are to be delivered. In this connection our invention contemplates also that the apparatus at the receiving end of the conveyor shall be so constructed and arranged as to reduce the number of conveyor chains in the main conveyor, as will appear hereinafter.

Our apparatus also contemplates the provision of means to feed a module containing a pallet or the like beneath the pick-up mechanism associated with the horizontal conveyor and also, by the same and common means, to withdraw the pallet from beneath said conveyor.

Our improved apparatus may also be used in association with a shuttle-type conveyor so that a load of cotton, such for instance as a palletized load, may be off-loaded from the transport vehicle endwise onto such shuttle conveyor, which shuttle conveyor may then present the palletized load endwise to our improved apparatus for feeding to the ginhouse.

DESCRIPTION OF THE DRAWINGS

Apparatus illustrating features of our invention is shown in the accompanying drawings forming a part of this application in which:

FIG. 1 is a somewhat diagrammatic plan view of a shuttle mechanism which may be used to receive the module of cotton, either palletized or otherwise, from a transport vehicle and to move it into axial alignment with an infeed conveyor presently to be described;

FIG. 2 is a side elevational view of the shuttle mechanism shown in FIG. 1;

FIGS. 4 to 8 inclusive are side elevational views of the main feed conveyors which are adapted to feed the module to the disperser unit;

FIG. 10 is a detail sectional view taken generally along line 10—10 of FIG. 9;

Figure 4:
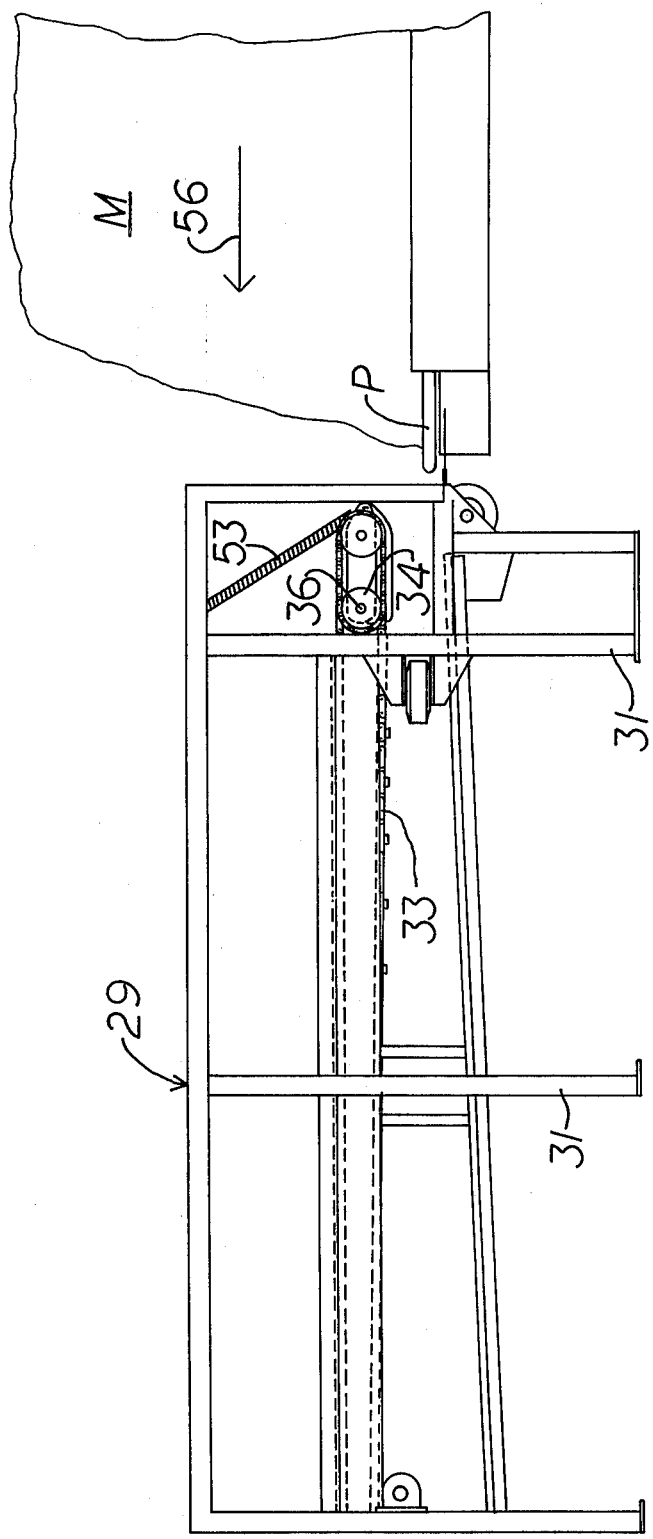
Figure 5:
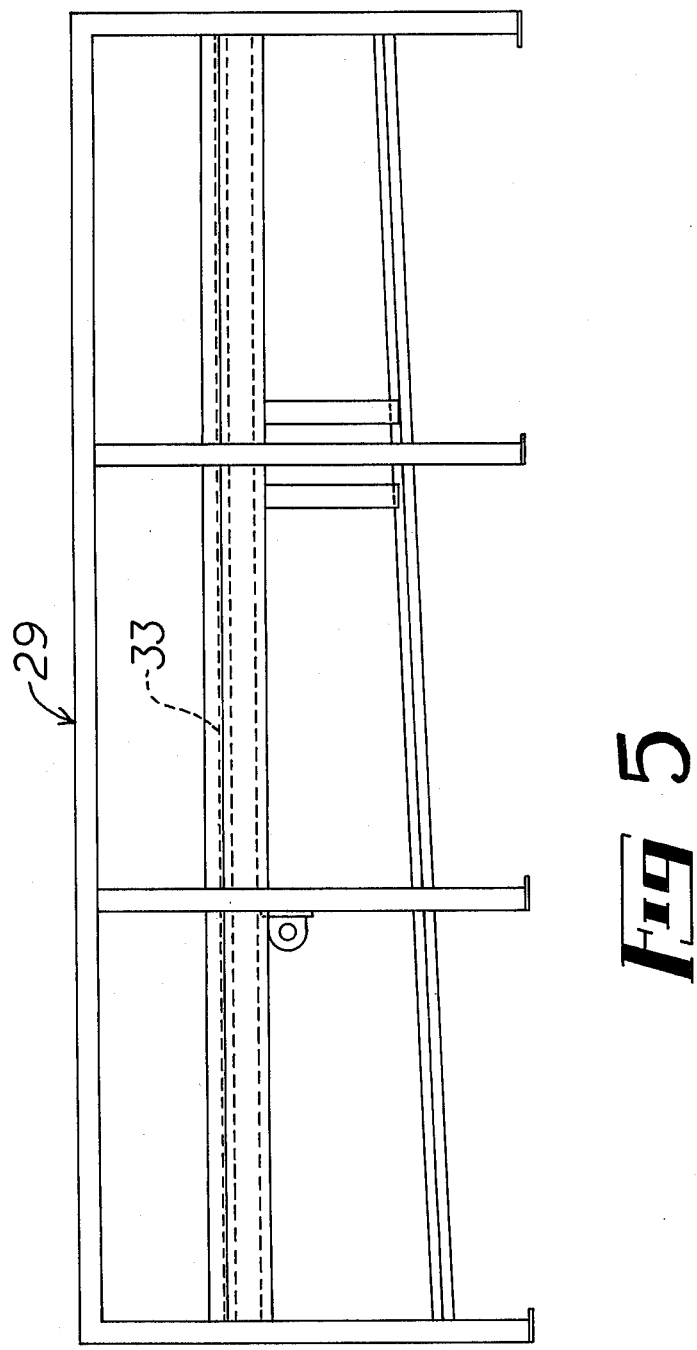
Figure 9:
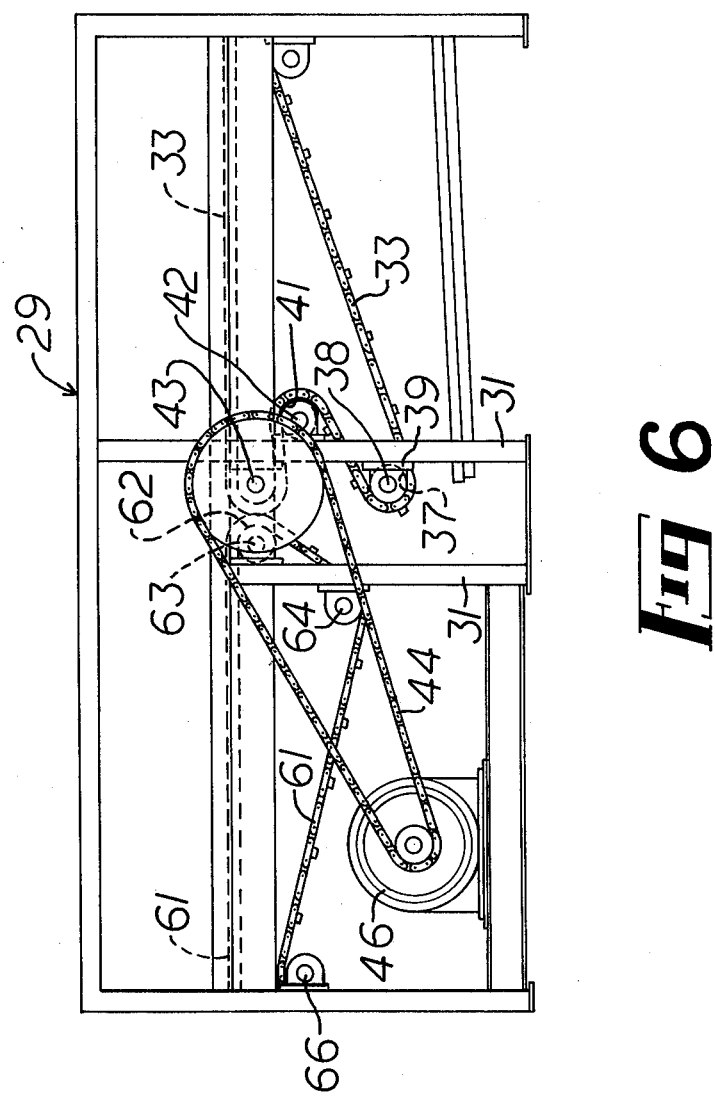
FIG. 9 is an enlarged detail plan view of the module pickup end of the conveyor shown in FIG. 4.

Referring now to the drawings for a better understanding of our invention, we will first describe a shuttle conveyor which may be used to receive a palletized module of cotton, pull the same endwise upon itself and then to shift laterally with the module thereon, into alignment with the receiving or loading end of my improved apparatus.

The shuttle conveyor comprises a frame having longitudinal members 10 and cross members 11. The cross members 11 form a sub-support for the main frame. Journaled in the members 11 are axles 12 and the axles carry wheels 13 which may run upon rails 14.

Mounted on the carriage is a motor such as a hydraulic or electric motor 16 and this motor drives a reduction gear box 17. Chains 18 transmit power from the output shaft of the reduction gear box 17 to the shaft 12 located on the side of the apparatus nearest the motor and reduction gear box. Another chain 19 is mounted on sprockets carried by the two shafts 12 so that when the motor 16 is energized the two shafts 12 are rotated in unison and in the same direction, thus to move the entire frame along the rails.

Mounted also on the frame is another motor 21 driving a reduction gear box 22. Mounted at the discharge end of the shuttle conveyor is a cross shaft 23. A plurality of chains 24 connects the output shaft of the reduction gear box 22 with the shaft 23 to rotate the said shaft 23.

Mounted on the shaft 23 adjacent its longitudinal center is a sprocket 26 over which passes a chain 27. The chain 27 may carry a hook 28 in its end which is adapted to be attached to the end of a pallet resting on a transport vehicle, so that when the shaft 23 is driven the entire palletized load is drawn onto the shuttle conveyor.

Our improved apparatus for receiving a module of cotton, either from the shuttle conveyor which has just been described or directly from a transport vehicle will now be described.

Referring now to FIG. 4 we show the situation in which the palletized module is moving from right to left onto our improved module pick-up and transport conveyor mechanism indicated generally by the numeral 29. Thus, the unit 29 may comprise vertical members 31, suitably cross-braced to form an open elongated frame.

The unit 29 may comprise a multiplicity of parallel, longitudinal extending chain support members 32. Mounted for sliding movement on top of the members 32 is a plurality of chains 33. The chains pass over suitable sprockets 34 at the pallet receiving end of the section 29 and these sprockets are mounted on a cross shaft 36 suitably journaled in the framework.

As best shown in FIG. 6 the lower flights of the chains 33 pass over idler sprockets 37 carried in a cross shaft 38. The shaft 38 is mounted in suitable bearing blocks 39 in turn mounted for vertical sliding movement on one of the upright members 31. The chains 33 pass over additional and suitable sprockets 41 carried by an idler 42 and thence return over suitable sprockets mounted on a shaft 43. The shaft 43 is powered through a chain 44 from a motor 46. It will be apparent that by adjusting the vertical position of shaft 38 the chains may be tightened when they become loose. It will also be apparent that with the motor 46 energized the entire group of chains 33 will move from right to left as viewed in the FIGS. under consideration and will thus move a module of cotton, as will be explained, from right to left.

Referring now particularly to FIGS. 4, 9, 11 and 12, we will now describe mechanism for either raising an unpalletized module from a suitable delivery or transport vehicle or for removing the cotton from the pallet P. This mechanism comprises a pair of plates 47 journaled on the shaft 36. Mounted in the plates is a shaft 48 and the shaft 48 carries a plurality of toothed lifting discs or wheels 49. The shaft 48 is powered from shaft 36 by means of sprocket chains 51 so that whenever the shaft 36 carrying the chains 33 is moving in the direction of arrow 52 the shaft 48 is rotated counterclockwise as viewed in the drawings.

The unit consisting of the shaft 48, the wheels 49 and the plates 47 are biased in an upward direction by means of springs 53 having one end attached to the free ends of the plates 47.

Figure 12:
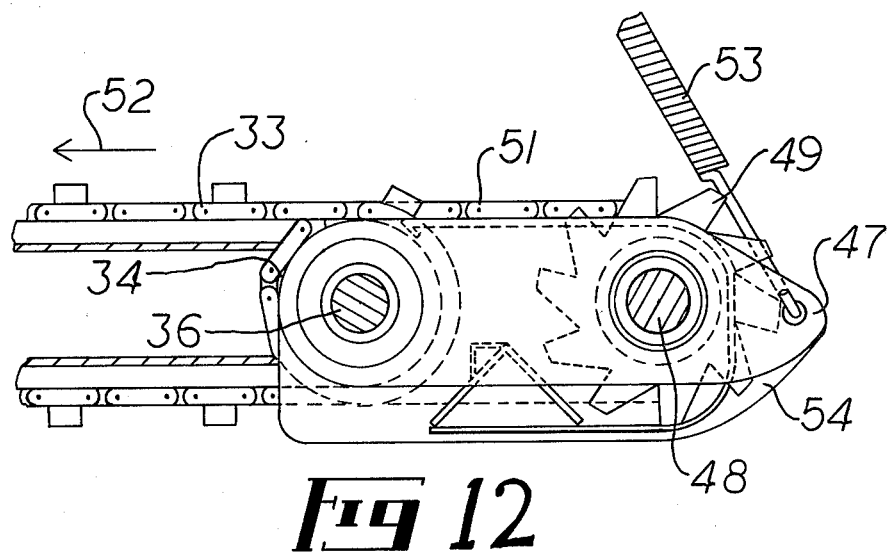
FIG. 12 is an enlarged vertical sectional view of the pick-up mechanism at the receiving end of the main conveyor.
Figure 3:
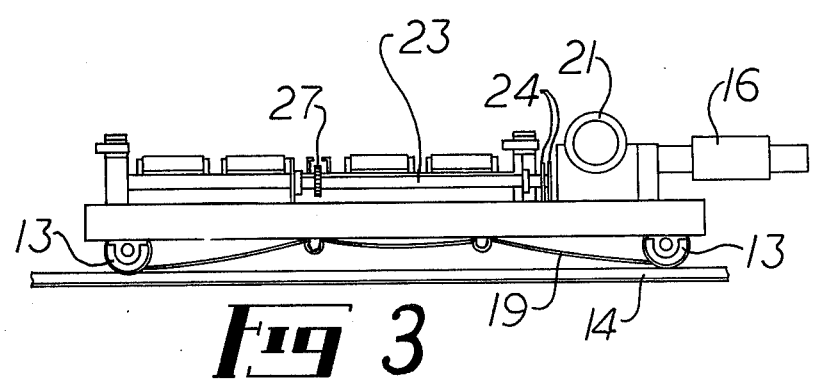
FIG. 3 is an end elevational view of the same.

Mounted intermediate the length of the shaft 48 are skid plates 54, rounded at their ends as illustrated in FIG. 12. The purpose of the skid plates will presently appear and it may here be stated that they contact the upper surface of the pallet P as the module is being unloaded as will be explained.

Extending over the discs 49 and notched as at 50 to receive the same is a stripper plate 50a. As the cotton is picked up, the stripper plate assures that any cotton tending to travel around with the discs 49 is removed therefrom.

Figure 11:
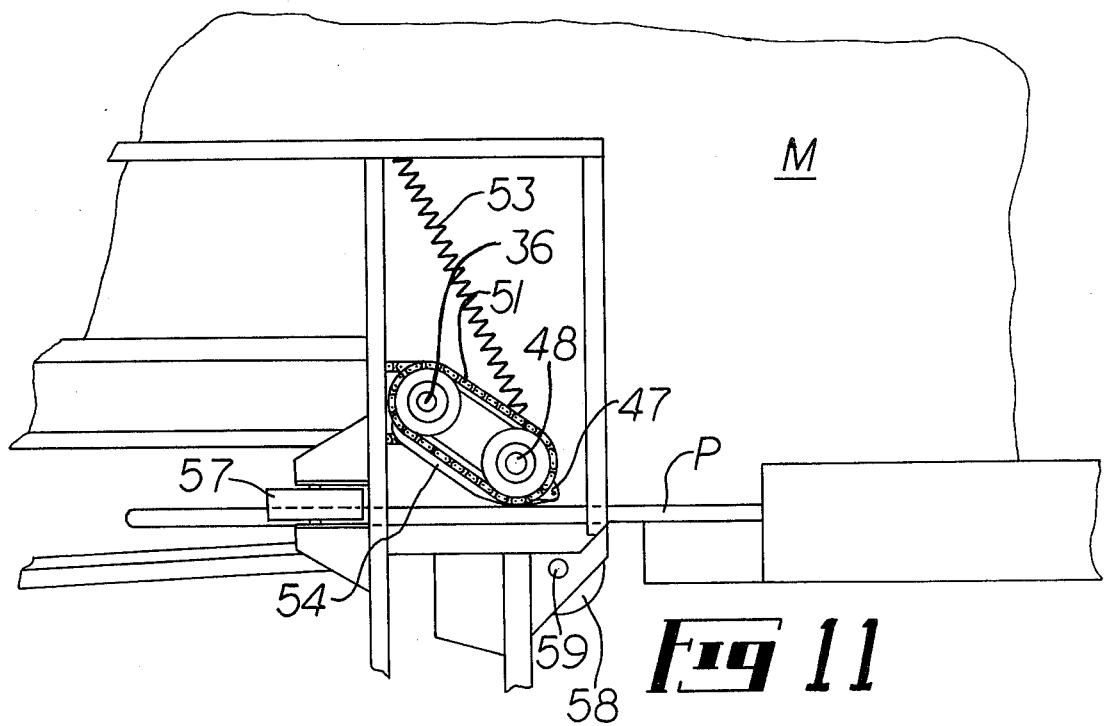
FIG. 11 is an enlarged side elevational view of the module pick-up end of the main conveyor.

Referring again to FIGS, 4 and 11 it will be understood that the module M on the pallet P is moving to the left as shown by the arrow 56, being propelled in this fashion either by the shuttle conveyor or by suitable mechanism on the transport vehicle which brings the palletized module from the field to my improved apparatus. When the end of the module of cotton contacts the skid plates 54 and the wheels 49, the shaft moves from the horizontal position relative to shaft 36 to a more downward position as illustrated particularly in FIG. 11. Continued counterclockwise rotation of the shaft 48 thus causes the wheel members 49 to lift the module of cotton from the pallet P up to a position whereby it gets on the upper flights of the chains 33. Thus, with the module being pushed from right to left as shown in FIG. 11 the pallet P thus passes beneath the entire conveying mechanism, the skid plates 54 contacting its upper surface. Guide rollers 57 may be provided to guide the pallet P in its lefthandward movement as the module of cotton is being stripped therefrom. Also, the pallet may be supported on suitable rollers 58, carried on a shaft 49, mounted in the framework in suitable fashion.

From what has just been described it will be seen that the oncoming module of cotton forces the shaft 48 to move downwardly, the plates 47 permitting this, and the chains 51 still applying power to the shaft 48. The skid plates 54 rest on top of the pallet P and the cotton on the pallet simply is raised upwardly by the lifting wheels 49 so that the pallet is stripped, the cotton module is now resting on the chains 33 and is moving then toward the disperser unit which will disperse the module, feeding the cotton in more or less lock or boll form to the ginhouse as will be explained.

Figure 7:
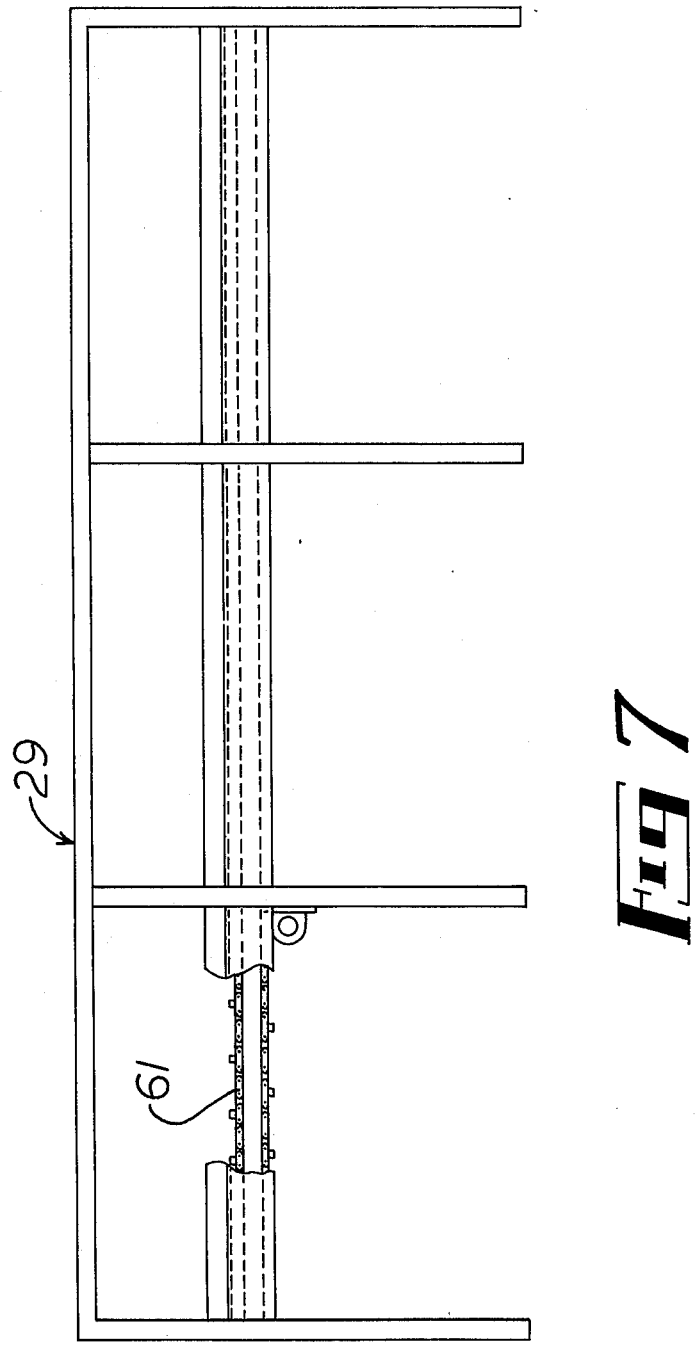

Referring now particularly to FIGS. 6, 7 and 8, it will be seen that immediately adjacent the shaft 43, namely, the driven ends of the chains 33 there are other chains 61, equal in number to the chains 33 and longitudinally aligned therewith and in fact, supported on members 32 just as are the chains 33. Thus, the righthandmost ends of the chains 61 pass over suitable sprockets 62 mounted on a shaft 63. The lower flights of the chains 61 pass over suitable sprockets carried on a vertically adjustable shaft 64 mounted on one of the vertical members 31 forming a part of the framework. The lower flights of the chains 61 finally pass over a series of sprockets carried by a shaft 66.

At the lefthandmost end of the apparatus we provide a motor 67 which drives an output shaft 68 of a gear reduction box 69. A chain 71 drives a shaft 72 mounted in suitable bearings. The shaft 72 carries a plurality of sprockets over which the chains 61 pass.

From what has been described so far it will be seen that the module of cotton on the righthandmost section of the apparatus, namely, supported and being moved along by the chains 33 may be driven at a slightly faster or slightly slower rate of speed than the chains 61. In other words, since there are two motors 47 and 67 for the respective chains 33 and 61, the speeds of these chains may vary so that if there happens to be any space between modules of cotton as loaded onto the apparatus the one just loaded may be speeded up in its movement toward the disperser unit.

Figure 13:
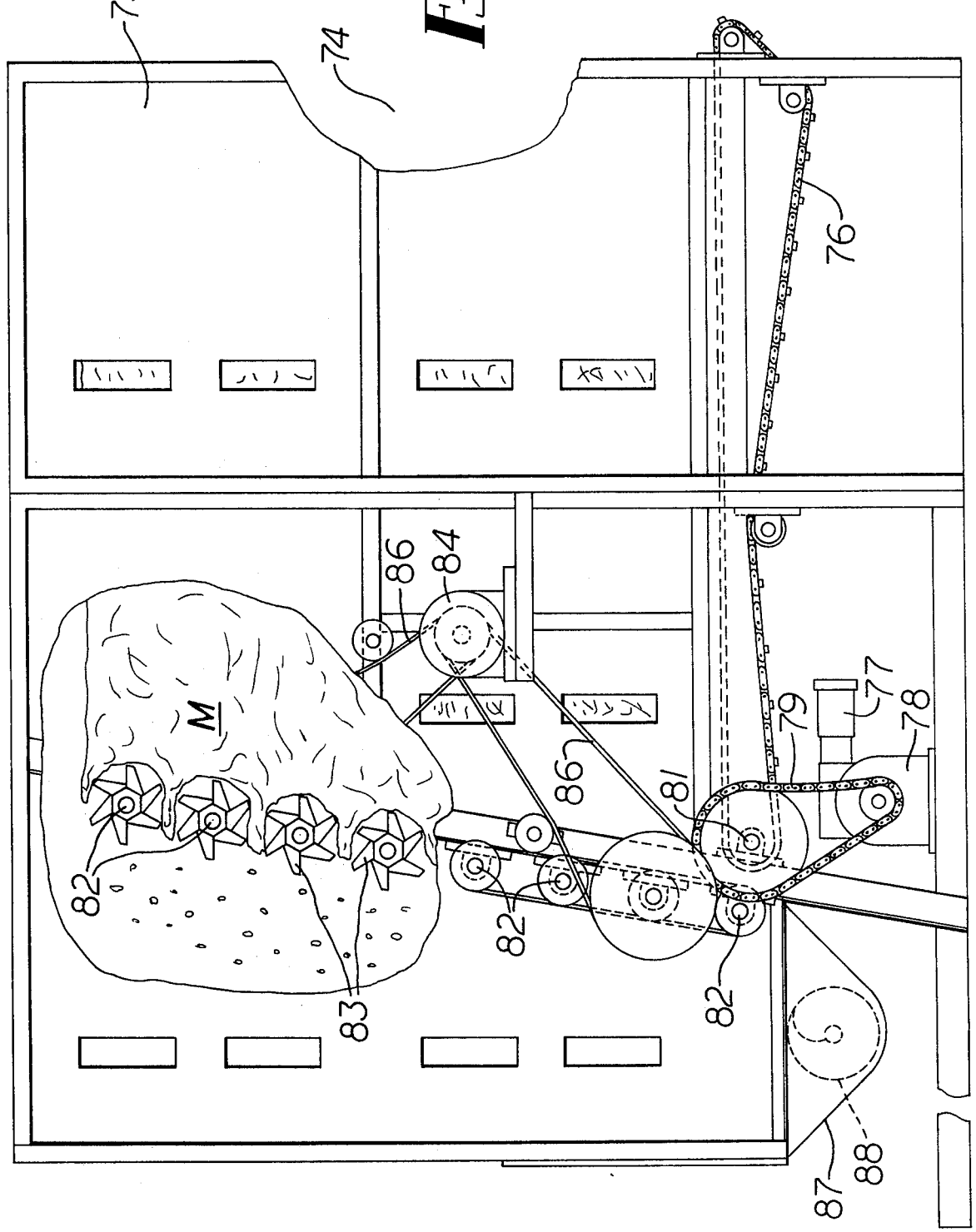
FIG. 13 is a side elevational view, with certain parts broken away and in section, of the disperser unit which receives the module, separates it substantially into bolls or locks of cotton for transmission to the ginhouse; and, FIG. 14 is an end elevational view of the disperser unit, partly broken away.
Figure 14:
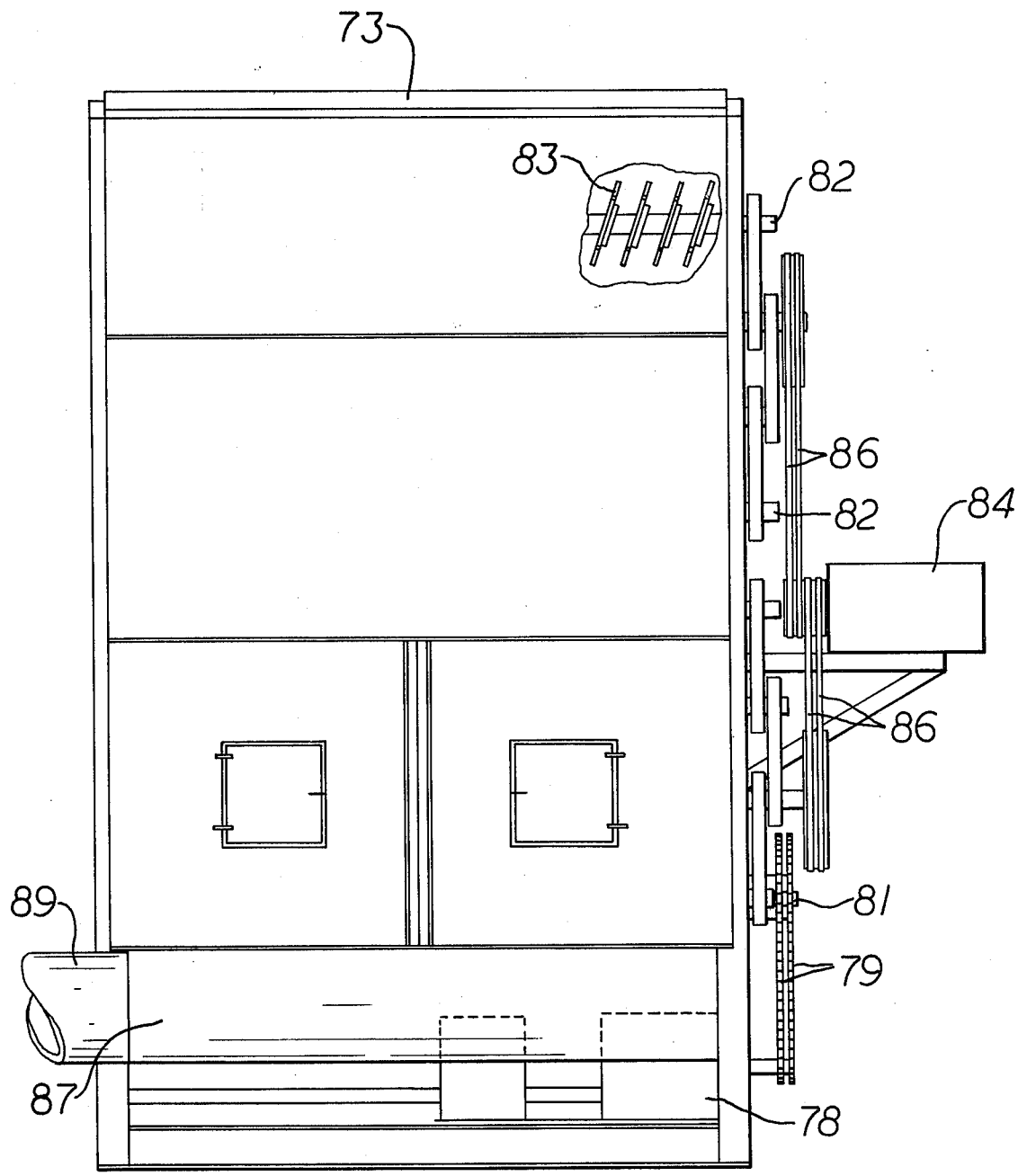

As shown in FIGS. 13 and 14 the disperser unit may comprise a housing 73 having an open end 74 to which the module of cotton from the chains 61 is delivered. The disperser unit may have a plurality of chains 76, forming the bottom thereof, these preferably being equal in number with the chains 31, 63 and 61 and which are suitably driven through a motor 77, reduction gear box 78, chain 79 which drives a shaft 81.

Extending across the entire width of the housing 73 is a plurality of shafts 82. As shown in FIG. 13, these shafts are located one above the other and slightly inclined from right to left.

On each of the shafts 82 is a plurality of disperser units 83 each of these being a toothed plate. As shown in FIG. 14 the disperser plates or units 83 are mounted at an angle to the shafts 82 to form what might be called "wobble plates."

Mounted on the side of the housing is a motor 84. The motor 84 through suitable belts, sprockets or the like indicated at 86 rotates all of the shafts 82 clockwise as viewed in FIG. 13.

Referring again to the operation of our improved apparatus it will be seen that with the module being moved from right to left in FIG. 13 the end of the module of cotton comes into contact with the rotating disperser elements 83 so that the cotton is separated into locks, bolls, or at least small wads. The cotton wads thus separated are thrown to the left bottom of the housing 73 as shown in FIG. 13. The housing is provided with a trough bottom 87 in which there is a screw conveyor 88. The screw conveyor removes the cotton laterally from the housing and delivers the same through a conduit 89 to the ginhouse.

From the foregoing it will be seen that we have devised an improved apparatus for receiving a module of cotton and conveying the same to a unit which disperses it into wads, bolls, and the like of a size to be sent to the ginhouse. Our apparatus is characterized by the fact that it may take either unpalletized or palletized modules of cotton. As will be appreciated, if an unpalletized module of cotton is being fed to the apparatus, the lifting members 49 would simply get under the same, and lift it upwardly just as it does when the plates 54 engage the top of a pallet as shown in FIG. 11. In other words, if a transport vehicle with suitable mechanism thereon for pushing the unpalletized module fron right to left as viewed in FIG. 11 were present, the cotton would in fact be lifted up by the members 49 as the load was being pushed onto them.

In view of the foregoing it will be seen that our invention is extremely versatile in handling these large modules of cotton which oftentimes may contain as many as 15 bales of seed cotton (approximately 22,500 pounds) and that it will do with a minimum amount of labor. Further, by having two feed chain sections there is no lost time in the feeding of the module to the disperser unit because, as stated, the chains 33 may be speeded up to move the module toward the disperser in the event there was a space between the module already being processed by the disperser and the one which has been loaded. Furthermore, it is advantageous to have an oncoming module press against the last or tail end of a module being processed by the disperser. This is for the reason that the elements 83 act best to disperse the cotton when there is pressure against them.

While we have shown our invention in but one form, it will be obvious to those skilled in the art that it is not so limited, but is susceptible of various changes and modifications without departing from the spirit thereof.

What we claim is:

1. In apparatus for removing modulized seed cotton and the like from a pallet,
   a. a generally horizontal conveyor having a surface capable of supporting seed cotton thereon and having a receiving end,
   b. means permitting the pallet to move beneath the conveyor,
   c. means associated with the receiving end of the conveyor to lift the modulized cotton from the surface of the pallet and present it to the surface of the conveyor comprising a pivoted cotton lifting section embodying cotton pick-up members having upwardly moving surfaces engageable with the oncoming end of the module, thus to raise the same, and
   d. stop members effective to limit downward pivoting movement of said cotton lifting section upon engagement with the top of the pallet.

2. Apparatus as defined in claim 1 in which said cotton lifting means comprises a plurality of toothed discs mounted in spaced relation to each other on a common, driven shaft and stationary stripper means spanning the spaces between said discs and effective to strip the cotton from said toothed discs as it is presented to said conveyor.

3. For use in lifting and moving a module of seed cotton or the like,
   a. a generally horizontal conveyor having a cotton module supporting surface constructed and arranged to move the module of cotton to be placed thereupon,
   b. a plurality of lifting members located adjacent the receiving end of the conveyor,
   c. means mounting said lifting members for rotation,
   d. means mounting the lifting members for vertical movement from a position with the upper surfaces of said members substantially at the level of the supporting surface of said conveyor to a position below the level of said surface, whereby an oncoming module of cotton is engaged along its lower surface and lifted onto the conveyor, and
   e. means resiliently biasing the lifting members toward said upper position.

4. Apparatus as defined in claim 3 in which each of the lifting members is a toothed, plate-like member, and in which there is means associated with said members to limit downward movement thereof whereby, when removing a module of cotton from a pallet or the like, said members which limit downward movement contact the upper surface of the pallet while the lifting members are removing the cotton therefrom.

5. Apparatus as defined in claim 3 in which the lifting members embody rotary cotton lifting surfaces, and means supporting said rotary surfaces closely adjacent the surface from which said module is being lifted.

6. For use in removing cotton from a generally flat surface,
   a. a conveyor having a cotton receiving end,
   b. a pick-up mechanism for delivering the cotton to the receiving end of the conveyor comprising:

1. a frame pivoted adjacent one end to the receiving end of the conveyor and extending outwardly therefrom,
2. a plurality of toothed discs mounted in spaced relation to each other on a common, driven shaft,
3. means to rotate said discs with the cotton engaging teeth thereof moving upwardly, and
4. stationary stripper means spanning the spaces between said discs and effective to strip cotton from said toothed discs as it is presented to said conveyor.

7. Apparatus as defined in claim 6 in which there are skid members carried by the pivoted frame projecting outwardly past the peripheries of the toothed discs, thereby to hold the discs out of contact with the surface on which the cotton rests while being picked up.

8. Apparatus as defined in claim 6 in which there is means biasing the free end of the frame upwardly, whereby the rotating discs may be held elevated until they contact the mass of cotton to be removed, permitting the apparatus to remove cotton from an irregular surface on which it rests.

* * * * *